United States Patent
Kumar et al.

(10) Patent No.: US 12,327,482 B2
(45) Date of Patent: Jun. 10, 2025

(54) RADIO FREQUENCY INTERFERENCE DATABASE FOR VEHICLE NAVIGATION PLANNING

(71) Applicant: Honeywell International Inc., Charlotte, NC (US)

(72) Inventors: Perumal Kumar, Bangalore (IN); Sanjay Lenka, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 284 days.

(21) Appl. No.: 17/933,804

(22) Filed: Sep. 20, 2022

(65) Prior Publication Data
US 2024/0013663 A1 Jan. 11, 2024

(30) Foreign Application Priority Data
Jul. 8, 2022 (IN) .............................. 202211039324

(51) Int. Cl.
G08G 5/34 (2025.01)
G08G 3/00 (2006.01)
H04B 17/345 (2015.01)

(52) U.S. Cl.
CPC ................. G08G 5/34 (2025.01); G08G 3/00 (2013.01); H04B 17/345 (2015.01)

(58) Field of Classification Search
CPC ....... G08G 5/0039; G08G 3/00; H04B 17/345
See application file for complete search history.

(56) References Cited

U.S. PATENT DOCUMENTS

| | | | |
|---|---|---|---|
| 7,592,897 | B2 | 9/2009 | Diorio et al. |
| 8,068,855 | B2 | 11/2011 | Dressler et al. |

(Continued)

FOREIGN PATENT DOCUMENTS

| | | |
|---|---|---|
| CN | 107204822 B | 12/2019 |
| EP | 2773162 A1 | 9/2014 |

(Continued)

OTHER PUBLICATIONS

European Cockpit Association (ECA), "Specific Operations Risk Assessment (SORA)", Position Paper, Jan. 28, 2019, as downloaded on Mar. 2, 2022 from https://www.eurocockpit.be/positions-publications/specific-operations-risk-assessment-sora, pp. 1 through 10.

(Continued)

*Primary Examiner* — Shon G Foley
(74) *Attorney, Agent, or Firm* — Fogg & Powers LLC (57) ABSTRACT

An RF interference database provides RF signal characteristics associated with a plurality of geographical locations. A travel planning system on a vehicle or other processing system can disseminate data including the RF signal characteristics to multiple operating systems on at least one vehicle in a network. Disseminating data can include generating a report sent to the operating system(s), generate threat levels and/or alerts based on the severity of RF interference in the geographical location, provide a system use recommendation on operating parameters and/or alternative operating systems for use in the geographical location. A vehicle can also take ameliorative action, such as modifying a travel path based on data disseminated from the RF interference database and/or conduct integrity checks on the operating systems.

20 Claims, 6 Drawing Sheets

(56) References Cited

U.S. PATENT DOCUMENTS

| | | | |
|---|---|---|---|
| 8,319,502 | B2 | 11/2012 | Hashimshony et al. |
| 9,363,642 | B2 | 6/2016 | Fischer et al. |
| 11,150,654 | B2 | 10/2021 | Michini et al. |
| 11,194,052 | B1 | 12/2021 | Kazmierczak et al. |
| 2018/0004207 | A1 | 1/2018 | Michini et al. |
| 2019/0021012 | A1 | 1/2019 | Beck et al. |
| 2019/0121365 | A1 | 4/2019 | Passot et al. |
| 2019/0207959 | A1 | 7/2019 | Winkle et al. |
| 2020/0037219 | A1* | 1/2020 | Kumar .................. B64C 19/00 |
| 2022/0223059 | A1* | 7/2022 | Kawiecki .............. G01S 13/933 |
| 2023/0382424 | A1* | 11/2023 | Hay ........................ G01S 19/21 |

FOREIGN PATENT DOCUMENTS

| | | | |
|---|---|---|---|
| EP | 2773162 | B1 | 10/2018 |
| EP | 3691327 | A1 | 8/2020 |
| FR | 3020529 | A1 | 10/2015 |
| JP | 2022024732 | A | 2/2022 |
| WO | 2018019394 | A1 | 2/2018 |

OTHER PUBLICATIONS

Federal Aviation Administration, "5G and Aviation Safety", as downloaded on Mar. 2, 2022 from https://www.faa.gov/5g, pp. 1 through 5, Published: US.

Mohan et al., "Systems and Methods to Provide Real-Time Context-Based Avoidance Mechanisms for GNSS Jamming or Spoofing Regions", U.S. Appl. No. 17/685,208, filed Mar. 2, 2022, pp. 1 through 30.

Robin et al., "Interference Risk to Radar Altimeters from Planned 5G Telecommunication Systems", RTCA Webinar, Nov. 30, 2020, pp. 1 through 21.

European Patent Office, "Extended European Search Report", from EP Application No. 23180371.9, from Foreign Counterpart to U.S. Appl. No. 17/933,804, filed Dec. 5, 2023, pp. 1 through 8, Published: EP.

* cited by examiner

RADIO FREQUENCY INTERFERENCE DATABASE FOR VEHICLE NAVIGATION PLANNING

CROSS-REFERENCE TO RELATED APPLICATIONS

This application claims the benefit of, and priority to, Indian Provisional Patent Application No. 202211039324, filed on Jul. 8, 2022, and titled "RADIO FREQUENCY INTERFERENCE DATABASE FOR VEHICLE NAVIGATION PLANNING", the contents of which are hereby incorporated in their entirety.

BACKGROUND

Vehicles, such as aircraft, utilize radio frequency (RF) signals to communicate to other vehicles and ground entities, and to operate various systems onboard the vehicle. For example, some aerial vehicles use radar altimeters to measure the altitude of the vehicle during flight for use in navigating the vehicle. Vehicles also utilize RF communications to communicate with ground stations during take off or landing preparations. However, landing zones can be highly saturated with air traffic control centers transmitting RF signals, and an aircraft may encounter other sources of high-concentrated RF signal transmissions unknown to the vehicle before flight.

RF signals from an external source can cause destructive interference to RF systems utilized by a vehicle, such as RF altimeters, RF guidance systems, or communications systems onboard the vehicle. Left unchecked, RF signal interference can interrupt system operability, damage or erode system performance, or malfunction. As a result, significant RF interference can pose a severe/catastrophic risk to vehicles that rely on RF signal transmissions for travel and navigation.

SUMMARY

The details of one or more embodiments are set forth in the following description. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a program product is disclosed. The program product comprises a non-transitory processor-readable medium on which program instructions configured to be executed by at least one processor are embodied. When executed by the at least one processor, the program instructions cause the at least one processor to: gather radio frequency (RF) signal characteristics associated with a plurality of geographical locations, the RF signal characteristics providing potential RF signal interference information used in at least one of preparing and adjusting vehicle travel paths; store data including the RF signal characteristics associated with each of the plurality of geographical locations in an RF interference database; and disseminate the data including RF signal characteristics associated with the plurality of geographical locations in the RF interference database to at least one operating system of a plurality of vehicles in a communications network configured to plan a travel path through at least one of the plurality of geographical locations.

In another embodiment, a method is disclosed. The method comprises gathering radio frequency (RF) signal characteristics associated with a plurality of geographical locations, the RF signal characteristics providing potential RF signal interference information used in at least one of preparing and adjusting vehicle travel paths. The method further comprises storing data including the RF signal characteristics associated with each of the plurality of geographical locations in an RF interference database. The method further comprises disseminating the data including RF signal characteristics associated with the plurality of geographical locations in the RF interference database to at least one operating system of a plurality of vehicles in a communications network configured to plan a travel path through at least one of the plurality of geographical locations.

In another embodiment, a travel planning system configured to be implemented on a vehicle is disclosed. The vehicle travel planning system comprises at least one operating system configured to control vehicle operations. The travel planning system further comprises a processing system coupled to the at least one operating system. The processing system comprises at least one processor and a memory coupled to the at least one processor, wherein the at least one processor is configured to execute an RF interference application stored in the memory. When executed, the RF interference application causes the at least one processor to: gather radio frequency (RF) signal characteristics associated with a plurality of geographical locations, the RF signal characteristics providing potential RF signal interference information used in at least one of preparing and adjusting vehicle travel paths; store data including the RF signal characteristics associated with each of the plurality of geographical locations in an RF interference database stored in the memory; and disseminate the data including RF signal characteristics associated with the plurality of geographical locations in the RF interference database to the at least one operating system of the vehicle. The travel planning system is configured to at least one of prepare and adjust a travel path through at least one of the plurality of geographical locations based on the disseminated data, and adjust an operating parameter of the at least one operating system in response to a threat evaluation to the at least one operating system based on the disseminated data.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly referenced below and as further described in the detailed description.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The present disclosure provides embodiments of a centralized RF interference database that can be accessible to multiple vehicles and ground entities in a communications network. The RF interference database provides real-time information on potential RF signal interference from RF sources radiating in various geographical locations where navigating through such locations would pose a risk to vehicles from adverse impacts from RF interference. In various embodiments the RF interference database can be periodically maintained and updated as RF environments change so that a vehicle operator can be informed of potential RF interference zones a priori before or during navigation, thereby providing a dynamic solution for vehicle operators to prepare or adjust travel paths to mitigate the risk of RF interference to vehicle equipment. Additionally, the present disclosure includes various techniques for assisting vehicles during navigation planning with data gathered by the RF interference database, including system use recommendations or threat assessments, that can be used by a vehicle to plan a travel path that avoids or mitigates potential RF interference during travel.

Figure 1:
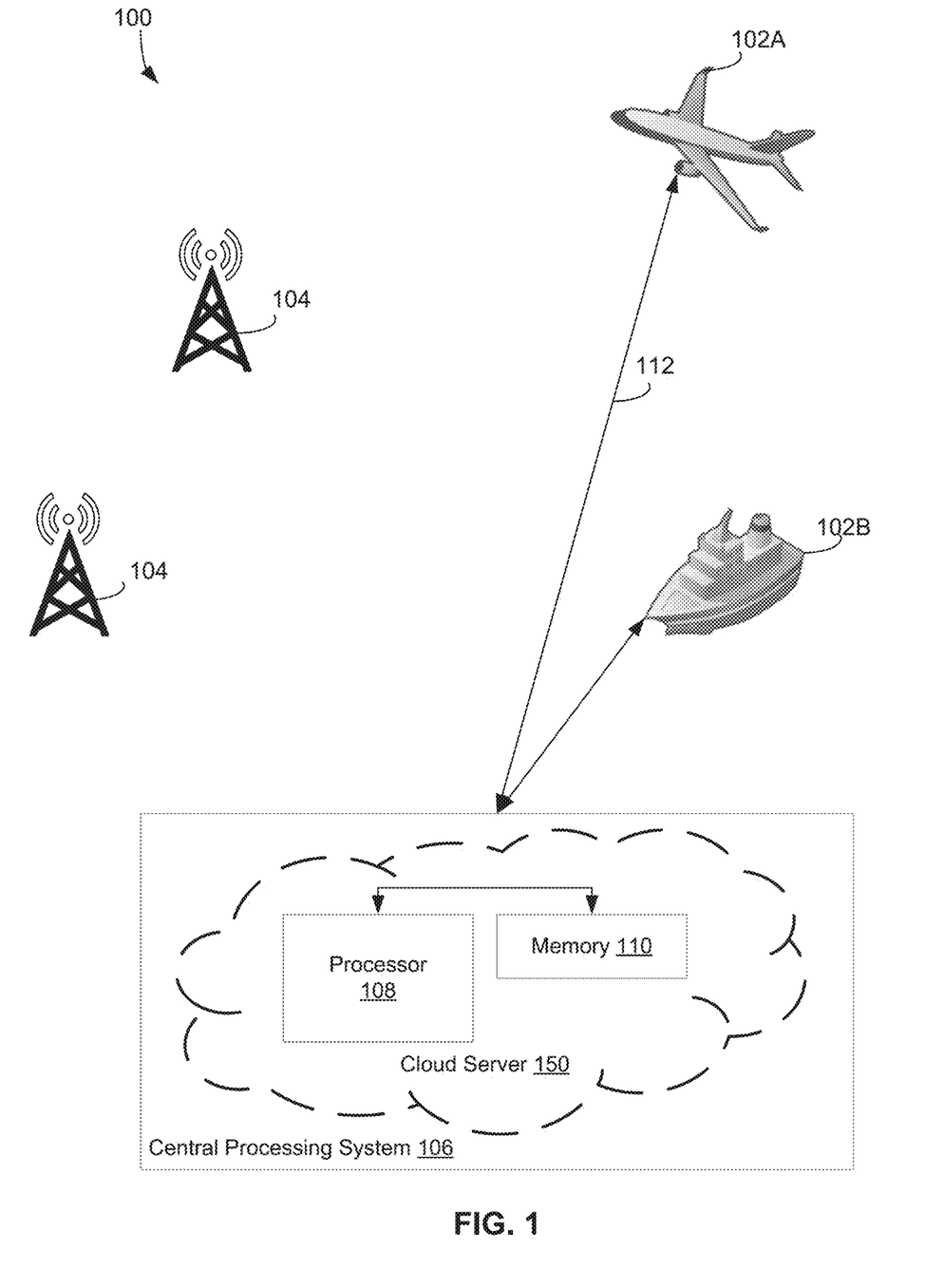
FIG. 1 depicts a diagram of an exemplary communications network including an RF signal interference database accessible to multiple vehicles in the network.

FIG. 1 depicts a diagram of an exemplary communications network including an RF signal interference database accessible to multiple vehicles in the network. The communication network 100 includes a plurality of vehicles (pedagogically shown as an aircraft 102A and a ship 102B) traversing through one or more geographical locations. Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned vehicles (e.g., urban air mobility (UAM) vehicles), water traversing vehicles (e.g., ships, submarines), and land traversing vehicles (e.g., automobiles including cars, trucks, motorcycles). Throughout the disclosure, the vehicle may be further illustrated as an aircraft with the understanding that the principles described herein apply to other vehicles where applicable.

As the vehicles 102A, 102B traverse through geographical locations covered through their respective travel paths, they may encounter significant RF interference from one or more RF sources 104. The RF sources 104 can be, for example, frequency modulation (FM) broadcast stations, HD stations, or temporary sources such as signal spoofers or jammers, and any other entity that radiates RF signals proximate to the travel path of the vehicle. For pedagogical illustration, the RF sources 104 are shown and described as RF broadcast towers 104 understanding that the same principles apply to other RF sources. The RF signals transmitted by the RF broadcast towers 104 may impact the various operating systems implemented on the vehicle 102A, 102B that utilize RF waves. "Operating system" as used herein means a system onboard the vehicle that is configured to control operations of the vehicle. Vehicle operations include (but not limited to): travel planning operations, travel control (e.g., flight control) operations, navigation operations, communication operations, and sensor operations (for example, by gathering sensory data used for travel).

In one example, external RF signals can destructively interfere with RF signals transmitted by various equipment on the vehicle. In geographical areas with high concentrations of RF sources 104, the RF signals propagating through the geographical areas can pose a substantial threat to equipment integrity on the vehicles 102A, 102B. Radar altimeters, for example, function to determine the altitude of the vehicle by sending RF pulses towards the terrain and receiving a reflected RF pulse at a receiver coupled on the vehicle. Also, a vehicle may include RF receivers (e.g., a localizer receiver, a VOR receiver, a DME transceiver) to transmit RF signals to a designated transceiver on the terrain and to receive a reflected RF signal to determine parameters such as the angular and lateral distance from the terrain. RF signals from external entities from the vehicle can interfere or alter the transmitted RF signals from the vehicle and thereby render these systems completely inoperable by the vehicle.

To protect the operating systems and personnel onboard the vehicles 102A, 102B from potential degradation from RF interference, the vehicles can prepare or adjust their travel paths based on data disseminated by an RF interference database hosted by a central processing system 106. Central processing system includes at least one processor 106 coupled to a memory 110. In some embodiments, the central processing system 106 is located remotely from the vehicles 102A, 102B as shown in FIG. 1 (such as a system located in a ground station or a remote server), although central processing system 106 may be implemented as a processing system on one of the vehicles in the communications network 100. In some embodiments central processing system 106 can be virtualized on a cloud server 150 accessible to vehicles 102A, 102B in a cloud-based network. Alternatively, central processing system is implemented by hardware (processing circuitry) that performs the processing functions with the RF interference database. Processor 108 and the other processing units described herein may include any one or combination of processors, microprocessors, digital signal processors, application specific integrated circuits, field programmable gate arrays, and/or other similar variants thereof. Processor 108 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

These instructions are stored in memory 110 which includes any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAM-BUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 2:
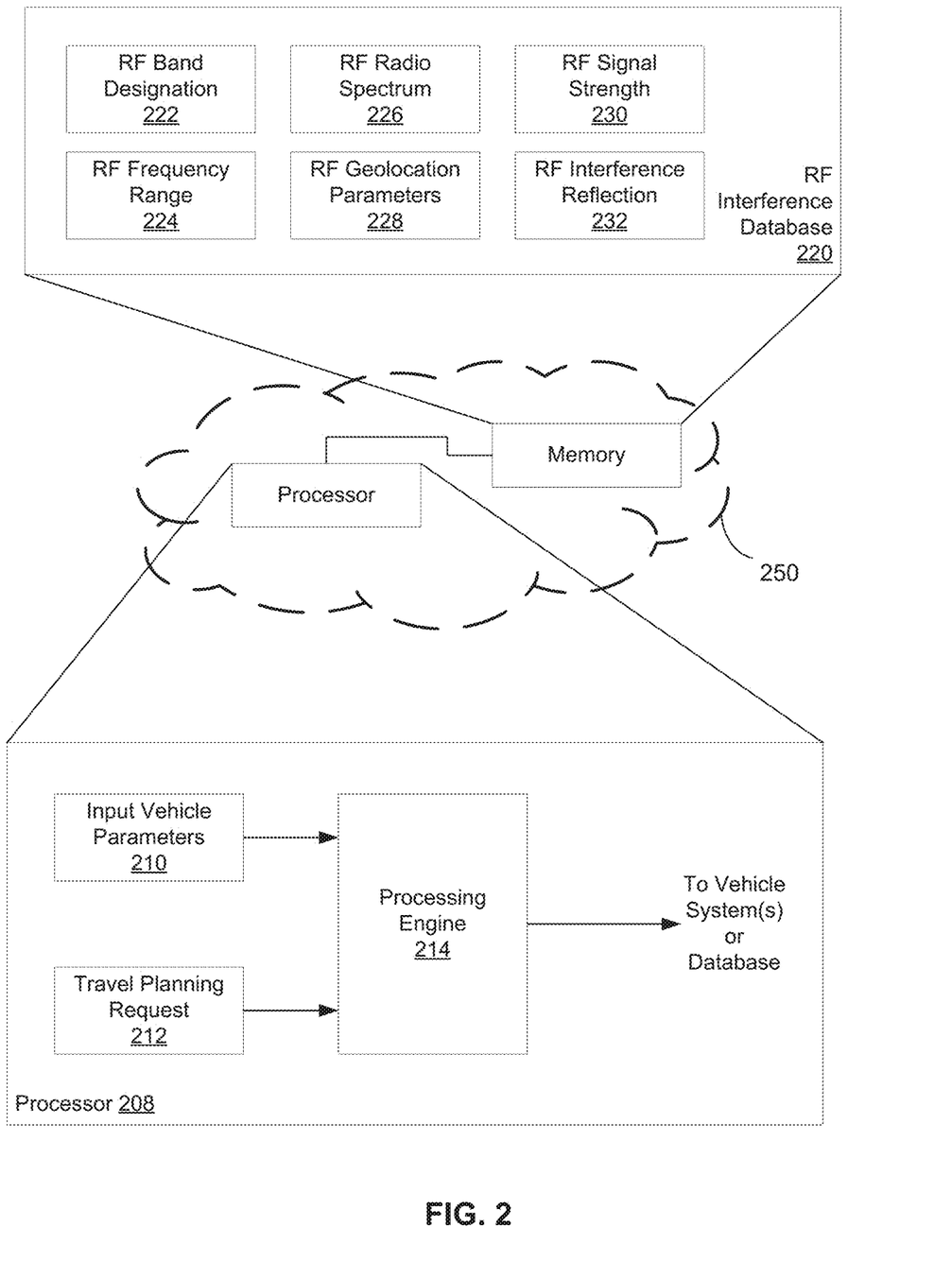
FIG. 2 depicts a block diagram of an exemplary RF interference database accessible to multiple vehicles over a cloud server.

One example of a virtualized processing system is shown in FIG. 2, which depicts a block diagram of an exemplary RF interference database accessible to multiple vehicles over a cloud server 250. The RF interference database 220 can include RF signal characteristics gathered a priori from other vehicles, ground systems, independent sensor systems, and/or regulatory sources in one or more geographical locations. Among the RF signal characteristics stored in the RF interference database 220 include the RF base designation 222, the RF radio spectrum 226, the RF signal strength 230, the RF frequency range 224, the RF geolocation parameters 228, and the RF interference reflection coefficients 232. The RF band designation 222 provides the characterization of the frequency band in which a designated frequency band corresponds to. Examples of band designations include the high frequency (HF), very high frequency (VHF), ultra high frequency (UHF), L-band, c-band, extended c-band, x-band, KU-band, and the like.

The RF radio spectrum 226 is a measure of the RF frequencies occupied for various systems onboard the vehicle. Some exemplary systems and their associated frequencies are: omega navigation systems (10-14 kHz), automatic direction finder (190-1750 kHz), high frequency communications (2-30 MHz), very high frequency omnidirectional range (VOR) systems (108-118 MHz), very high frequency communications (118-399 MHz), distance measuring equipment (DME) transmitters (960-1220 MHz), traffic alert and collision avoidance systems (TCAS) (1030-1090 MHz), global navigation satellite systems (GNSS) (up to 1575 MHz), satellite communications (SATCOM) (1529-1661 MHz), radar altimeters (around 4.3 GHz), microwave landing systems (5.03-5.09 GHz), weather radar (up to 9.3 GHz), and other spectra.

The RF signal strength 230 provides information on the power of RF signals from the RF sources 104 in geographical locations. In some embodiments, the RF signal strength is determined based on a defined distance from the origin of a respective RF source 104, and may include RF signal strength measurements for multiple distances from the source. In some embodiments, the RF signal strength correlates to a particular set of three-dimensional spatial coordinates of a geographical location. Where multiple RF sources 104 are concentrated in a geographical location, the RF signal strength parameters can include information on the strength of each signal source radiating in the geographical location. By providing information on the RF signal strength, a vehicle traversing near the geographical location can anticipate the magnitude of interference that will impact the equipment onboard the vehicle if the vehicle relies on the equipment while traversing, and can alert the vehicle to change to another navigation or communication system before entering the geographical location.

The RF frequency range 224 provides information on operating systems (e.g., avionics systems) that operate in a designated frequency range. For example, a localizer receiver can operate in the frequency range of 108 MHz to 111.95 MHz. The RF interference database can use known operating systems on a vehicle or known operating systems in the one or more geographical locations with high RF signal interference to determine risk to RF systems on a vehicle traversing through the geographical locations and enable the vehicle to take corrective measures.

The RF geolocation parameters 228 provides information on the location of the known RF sources 104 that radiate RF signals in a geographical location. In one embodiment, the RF geolocation parameters are represented as three-dimensional spatial coordinates or as a latitude-longitude coordinate system. Providing information on the geolocation of significant RF sources indicates a strong likelihood that a vehicle traversing near the geographical location will experience significant RF signal interference should the vehicle attempt to utilize RF dependent equipment during navigation.

The RF interference reflection coefficients provides 232 a measure of the reflection coefficients for RF signals radiating from one or more RF sources in a geographical location. For example, tall buildings with metal structures tend to reflect external RF signals more than short buildings made of non-metallic materials. This is because buildings with more height have a greater chance of reflecting RF signals in the geographical location and that many metal surfaces act as conductors for RF signal propagation. Avionics RF receivers subjected to multipath reflections concentrated in a geographical location may lead to malfunctioning due to the presence of RF signals reflected between structures.

The RF interference database 220 may store other information as well.

To generate data for at least one of the RF signal characteristics stored in the RF interference database 220, RF receivers can be installed in defined distances away from a particular RF source 104 or from a designated reference point. For example, a technician may install one or more broadband receivers with omnidirectional antennas every 50 meters (for example) from a target RF source. Once the receivers are installed, the receivers receive RF signals from the RF signal source and provide the RF signals to processor 208 or another processing system, which is configured to determine one or more RF signal characteristics from the received RF signals. In one embodiment, processor 208 is configured to determine whether the RF signals received by the antennas exceed a designated threshold indicative of strong RF signal presence that is likely to impact one or more vehicles in the communications network, and if so, to determine and store the RF signal characteristics in the RF interference database 220. The thresholds used can vary depending on the type of vehicle and/or the system onboard a vehicle. For example, a UAM is likely to fly at lower altitudes than a large commercial aircraft and so may be more susceptible to RF signal interference of a ground RF source. In this case, the threshold may be set lower due to the proximity of the UAM to the ground source. In another example, a radar altimeter may be more adversely affected by RF signal interference than a GNSS receiver onboard a vehicle operating at their respective frequency ranges, and so the threshold level for RF signals corresponding to one frequency range (the radar altimeter in this example) will be lower than for RF signals corresponding to the operating frequency range of the GNSS receiver. Thus, multiple thresholds can be used for the storage or updating of the RF interference database 220 based on the type of vehicle and the type of system on the vehicle.

As part of a connected service to other vehicles or ground stations in the communications network 100, the RF interference database 220 can be used to provide tailored navigation assistance to the networked vehicles in response to a request from a vehicle. For example, when a vehicle enroute to a destination encounters unforeseen RF signal interference or during mission planning before takeoff, a vehicle operator may request a report from the processor 208 for the destination path that encounters one or more geographical locations with high RF signal interference. In response to receiving the request, the central processing system 106 utilizes at least the information stored in the RF interference database 220 to generate a report and provides the report to the vehicle. The report can include a detailed description of the RF signal interference anticipated to be experienced by the vehicle, for example, by including a list of the geographical locations with high RF signal interference that intersects the travel path of the vehicle, and also data of one or more of the RF signal characteristics that correspond to each respective geographical location (such as the frequency ranges of measured RF signals and their signal strength). Some of the RF sources can be fixed sources such as ground stations or temporary sources such as signal jammers or spoofers. Thus, in one embodiment, the description includes data on the type of RF source (a fixed or temporary source).

In one embodiment, the report includes a system use recommendation that can be provided to the vehicle on proposed operating parameters for one or more systems onboard the vehicle when traversing through high RF concentrated geographical locations. The system use recommendation includes the recommended operating parameters (if available) to one or more systems onboard the vehicle that utilize RF signal transmission. "Operating parameters" as used herein means parameters used for vehicle operations, such as parameters utilized by the operating systems of the vehicle. For example, if processor 208 determines based on the RF signal characteristics stored in the RF database that a particular system is able to be used on the vehicle without impacting the system, the processor 208 can determine the appropriate operating frequencies and transmit powers of that particular system and recommend those operating parameters to the requesting vehicle so that the vehicle can continue to use that particular system at the recommended operating parameters without being impacted from substantial RF interference. For a vehicle that includes a DME transmitter that generally operates in the frequency range from 960 MHz to 1220 MHz, central processing system 106 may determine, based on the RF signal characteristics for a geographical location referenced in the RF interference database, a recommended operating range between 960 MHz-1050 MHz for the vehicle due to high RF interference present in the frequency range above 1050 MHz. The operating ranges may also differ for other geographical locations covered by the travel path of the vehicle.

However, in some cases it may not be possible to utilize a particular system due to the nature of the RF interference at a geographical location. Accordingly, in some embodiments, the system use recommendation can provide a recommended alternative system (if available) for use while the vehicle is traversing through the geographical location(s) covered by the travel path. For example, if the vehicle includes alternative communication systems, such as a SATCOM system and a HF communication system, the processor 208 can utilize the RF signal characteristics stored in the RF interference database 220 to determine that the SATCOM system will experience stronger RF signal interference at the geographical location than the HF communication system, and/or that the HF communication system can be reliably used in the geographical location. From there, processor 208 then submits the system use recommendation to the vehicle recommending that the vehicle use the HF communication system for vehicle communication instead of the SATCOM system when traversing through the geographical location.

In another embodiment, the report provided to the vehicle includes a threat assessment of each geographical location covered by the travel path of the vehicle based on the RF signal characteristics. For example, the threat assessment can include a risk analysis of the RF signal interference present in the geographical locations and a threat level associated with each geographical location. A higher threat level means that, due to the presence of one or more RF sources, there is a higher concentration of RF signal interference in the geographical location and that there is a higher risk of impacting systems on the vehicle utilizing RF signal transmissions. Conversely, a lower threat level means that there is little to no RF signal interference present that will impact systems on the vehicle.

In another embodiment, the processor 208 is configured to synchronize data from the RF interference database 220 to one or more operating systems (e.g., avionics systems) of the vehicle. For example, when processor 208 accesses the RF interference database to generate a threat assessment, system use recommendation, or other report to a vehicle, it can synchronize the data in the report with multiple avionics systems that may be onboard the vehicle or offboard systems that are communicatively coupled to the vehicle via a local network.

Still referring to FIG. 2, processor 208 receives a travel planning request 212 from one or more vehicles in the communication network. The travel planning request 212 includes, for example, the proposed travel path of the vehicle and a request for a report on RF signal interference in one or more geographical locations covered by the travel path of the vehicle. In some embodiments, the travel planning request 212 includes a request for a system use recommendation for each geographical location covered by the travel path of the vehicle. Processor 208 also receives one or more vehicle parameters 210, which can include parameters about the vehicle (for example, the type and specifications of the vehicle) or on the various operating systems of the vehicle (for example, the type of communication, navigation, control, and sensor systems and the operating parameters of each system). The vehicle parameters 210 and travel planning request 212 are input into a processing engine 214, which is configured to generate the data specified in the travel planning request 212 and optionally to generate the system use recommendations outlined in the travel planning request 212 based on the RF signal characteristics stored in the RF interference database 220 and the vehicle parameters 210. In some embodiments, the processing engine 214 is implemented via machine learning techniques, for example including artificial neural networks such as a deep neural network (DNN), recurrent neural network (RNN), or inference-based processing to produce an output that conforms to the parameters of the travel planning request 212. Processor 208 is then configured to send the report to the vehicle via communication link 112.

Figure 3:
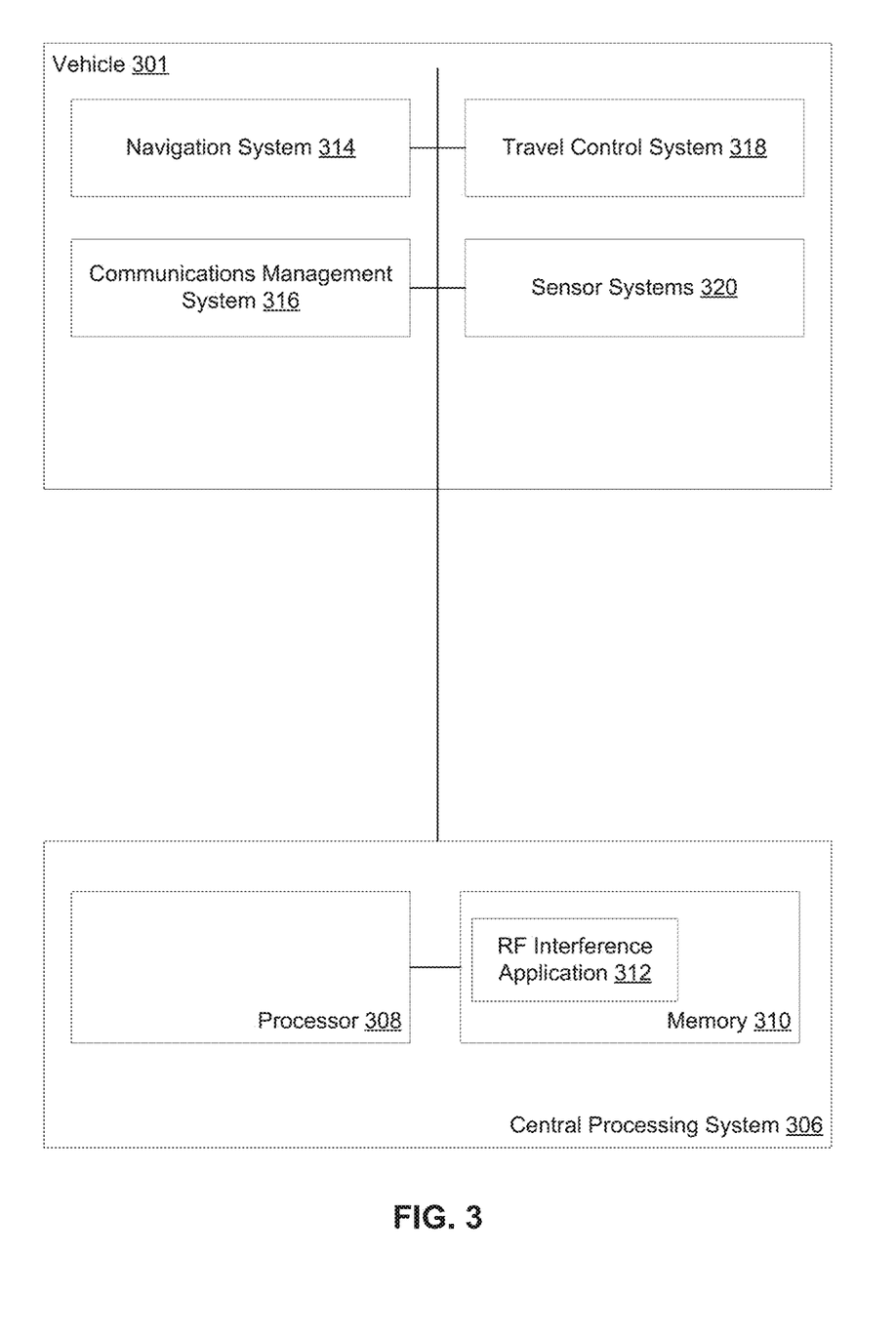
FIG. 3 depicts a block diagram of an exemplary vehicle and an exemplary RF interference application configured to provide data on RF signal characteristics to one or more operating systems on the vehicle.

FIG. 3 depicts a block diagram of an exemplary vehicle and exemplary RF interference database configured to provide data on RF signal characteristics to one or more systems on the vehicle. The vehicle 301 can be an aerial vehicle 102A, a water-traversing vehicle 102B, or any other type of vehicle. The vehicle 301 includes various operating systems configured to operate one or more aspects of the vehicle during travel. Some examples systems include a navigation system 314, a travel control system 318, a communications management system 316, and sensor systems 320. At least one of the operating systems described herein primarily utilize RF signal transmission to determine data for the vehicle 301. For example, the navigation system 314 includes a GNSS system comprising a GNSS receiver onboard the vehicle configured to determine a GNSS position solution of the vehicle using GNSS signals received from a constellation of satellites of a GNSS (e.g., GPS, Galileo, or Beidou). As an alternative position determining system, navigation system 314 includes an inertial navigation system comprising gyroscope(s), accelerometer(s), or magnetometer(s) configured to determine a position of the vehicle 301 not from RF signals, but from inertial measurement data. In some embodiments, the inertial navigation system includes an inertial measurement unit.

Travel control system 318 is configured to adjust the velocity of the vehicle 301 or other travel parameter of the vehicle 301 when in travel. For an aerial vehicle 102A, travel control system 318 can include a flight control system or flight management system configured to adjust the velocity or orientation of the vehicle based on data received from navigation system 314 or sensor systems 320.

Communications management system 316 is configured to monitor communications between one or more avionics systems on the vehicle and external recipients such as ground stations. For example, communications management system 316 can include a SATCOM system with datalink functionality to receive messages from one or more ground stations (communication in the uplink direction), and to send messages from another avionics system (which may be the communications management system 316 itself) to the ground station (communication in the downlink direction). In some embodiments, the avionics systems may include an electronic flight bag (EFB), Maintenance Terminal, a Cabin terminal, or an electronic device configured to execute one or more avionics software applications with a display or interface. Also, the communications management system 316 may be implemented as a communications management unit (CMU) for large commercial aircraft or can be virtualized as a communications management function (CMF) executed on one or more processors.

Sensor systems 320 include one or more sensors that provide information on various travel parameters of the vehicle 301. In some embodiments, the sensor systems 320 may include one or more of: a radar altimeter, a localizer receiver, VOR receivers, DME, light detection and ranging (lidar), as well as other sensors that do not rely on RF signal transmission (pitot tubes, for example, to measure air data parameters).

As previously described with respect to FIG. 2, in some embodiments vehicle 301 is configured to request access to the RF interference database stored in memory 310 of the central processing system 306. When central processing system 306 grants access to vehicle 301, processor 308 is configured to execute the instructions of RF interference application 312 stored in memory 310. RF interference application 312 enables the processor 308 to access the RF interference database and to provide an output based on the request sent by vehicle 301. For example, vehicle 301 is configured to send a request (e.g., by communications management system 316) for data on potential RF interference in one or more geographical locations covered by the planned travel path of the vehicle 301. Based on the data stored in the RF interference database, processor 308 is configured to send a report that includes a detailed description of the RF signal interference anticipated to be experienced by the vehicle, for example, by including a list of the geographical locations with high RF signal interference that intersects the travel path of the vehicle, and also data of one or more of the RF signal characteristics that correspond to each respective geographical location (such as the frequency ranges of measured RF signals and their signal strength). Additionally, or alternatively, the vehicle can send a request that includes a system use recommendation for at least one of the geographical locations with high RF interference. In this embodiment, the request includes the planned travel path of the vehicle 301 as well as operating parameters of system(s) onboard the vehicle 301 that rely on RF signal transmissions and potential alternative system(s) that can be used. In response, processor 308 is configured to send a system use recommendation based on the data stored in the RF interference database that includes, for each geographical location, the recommended operating parameters (if available) to one or more systems onboard the vehicle that utilize RF signal transmission and/or the operating parameters of alternative systems that can be used.

The report can be communicated to the vehicle 301 via a message received by communications management system 316. In some embodiments, the message is conveyed as an alert such as an aural or visual alert to an interface of an avionics system to an operator of the vehicle 301. The alert can be increased in severity as the vehicle 301 approaches a geographical location with high RF interference that will impact systems on the vehicle, particularly if these systems remain vulnerable to RF interference should the vehicle enter the geographical location (for example, if the system is operating at parameters that risks damage or inoperability to the system).

Vehicle 301 is configured to prepare and/or adjust a travel path to a destination based on the RF signal characteristics extracted from the RF interference database. In one embodiment, the vehicle 301 is configured to generate a modified travel path that avoids at least one of the geographical locations with high RF interference identified from the RF interference database. While vehicle 301 can generate a travel path before traversing to the intended destination, the travel path may also be modified once the vehicle begins travel to avoid any imminent or unforeseen RF sources intersecting the current travel path (as the RF interference database updates in real time) during travel. In some embodiments, one or more operating systems on the vehicle (including at least one of navigation system 314, travel control system 318, communications management system 316, or sensor systems 320) are configured to perform an integrity check based on data provided by the RF interference database. The integrity check can, for example, determine whether the operating system is operating properly as the vehicle 301 enters the geographical locations with high RF signal interference. If the results of the integrity check indicate that the operating systems are being impacted by RF signal interference, the affected operating systems can be disabled until the vehicle exits the geographical location. As an example, the integrity check can comprise generating a test signal having a frequency close to the frequency of RF signals in the geographical location (as extracted from the RF interference database). If analysis of the test signal indicates interference at the test frequency (resulting from external RF signals interfering with the test signal), the operating system sends a fault indicator to the pilot or other system on the vehicle. In response, the pilot or other system on the vehicle may disable the impacted operating systems.

Although FIG. 3 depicts a central processing system 306 separate from the vehicle 301, in some embodiments the functions of the central processing system 306 (including the instructions of RF interference application 312) can be implemented as part of a travel planning system implemented on the vehicle 301. The travel planning system may include or be coupled to at least one of the operating systems on vehicle 301, and configured to mitigate RF interference based on data from the RF interference database as previously described.

Figure 4:
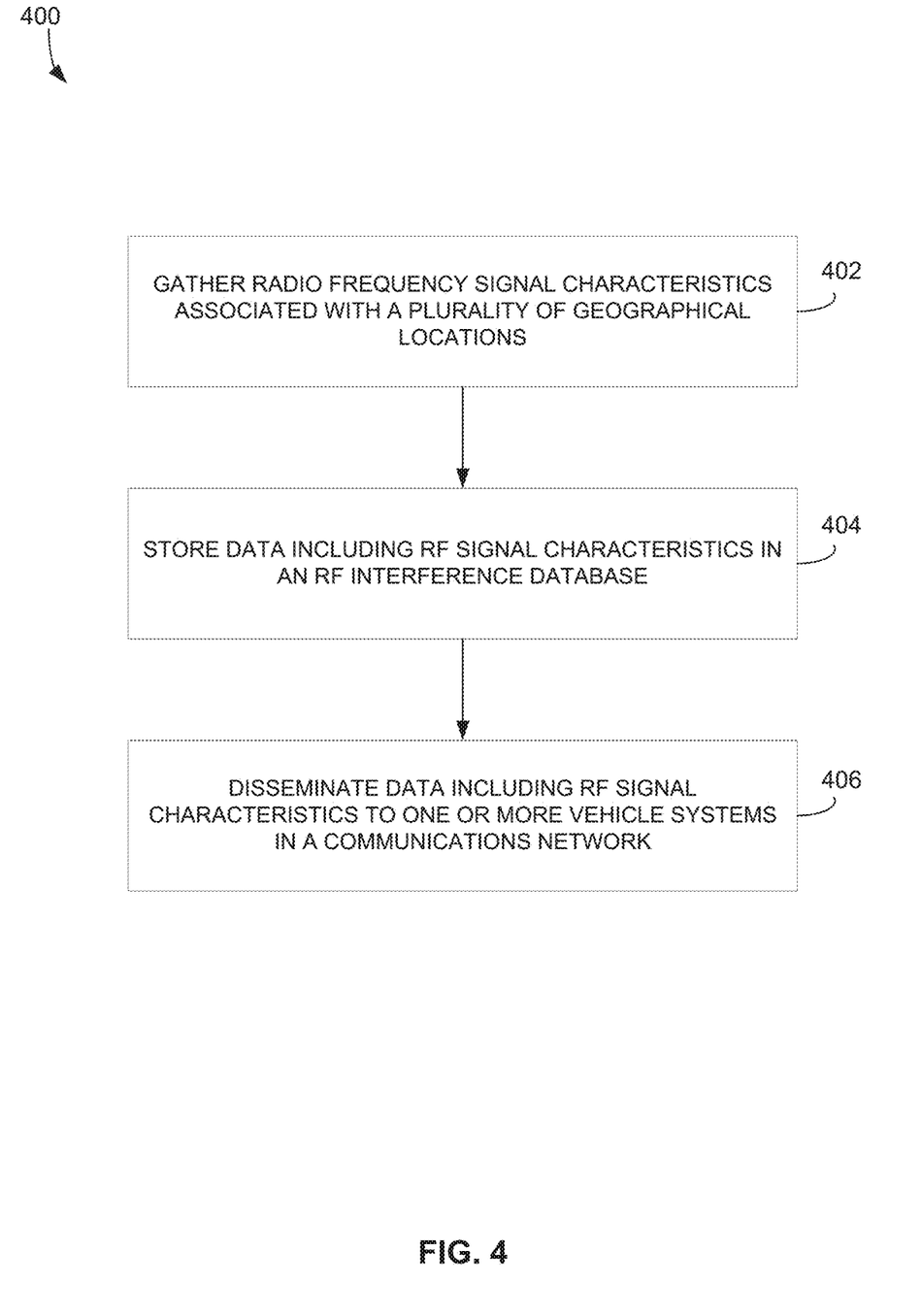
FIG. 4 depicts a flow diagram of an exemplary method for disseminating RF interference data to one or more vehicles in a communications network.

FIG. 4 depicts a flow diagram of an exemplary method for disseminating RF interference data to one or more vehicles in a communications network. Method 400 may be implemented via the techniques described with respect to FIGS. 1-3, but may be implemented via other techniques as well. For example, method 400 may be implemented in response to a request from a vehicle for travel planning assistance to provide data on RF interference for one or more geographical locations covered by the travel path of the vehicle. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 400 includes block 402, in which radio frequency signal characteristics associated with a plurality of geographical locations are gathered. The RF signal characteristics can include at least one of: RF frequency transmission, RF signal strength, RF reflection coefficients, RF geolocation, RF baseband designation, and RF frequency range. In one embodiment, gathering the RF signal characteristics includes determining the characteristics based on a defined distance from an RF source positioned in the geographical locations, such as by increments of 50 meters from the source.

Method 400 proceeds to block 404 and stores data including the gathered RF signal characteristics in an RF interference database. The RF interference database can be stored in a memory located in a central processing system accessible to multiple vehicles in a communications network, or can be stored in a processing system onboard the vehicle.

At block 406, method 400 proceeds by disseminating data including the stored RF signal characteristics to one or more vehicle operating systems in a communications network. In embodiments where the vehicle is an aerial vehicle, the vehicle operating systems can include avionics systems that receive the stored RF signal characteristics. Disseminating data can also include generating a report that includes detailed description of the RF signal interference anticipated to be experienced by the vehicle, for example, by including a list of the geographical locations with high RF signal interference that intersects the travel path of the vehicle, and also data of one or more of the RF parameters that correspond to each respective geographical location (such as the frequency ranges of measured RF signals and their signal strength). Additionally, or alternatively, the vehicle can send a request that includes a system use recommendation for at least one of the geographical locations with high RF interference. Additionally, or alternatively, the report can include a threat level associated with the extent of RF signal interference that corresponds to each geographical location in the travel path of the vehicle.

Figure 5:
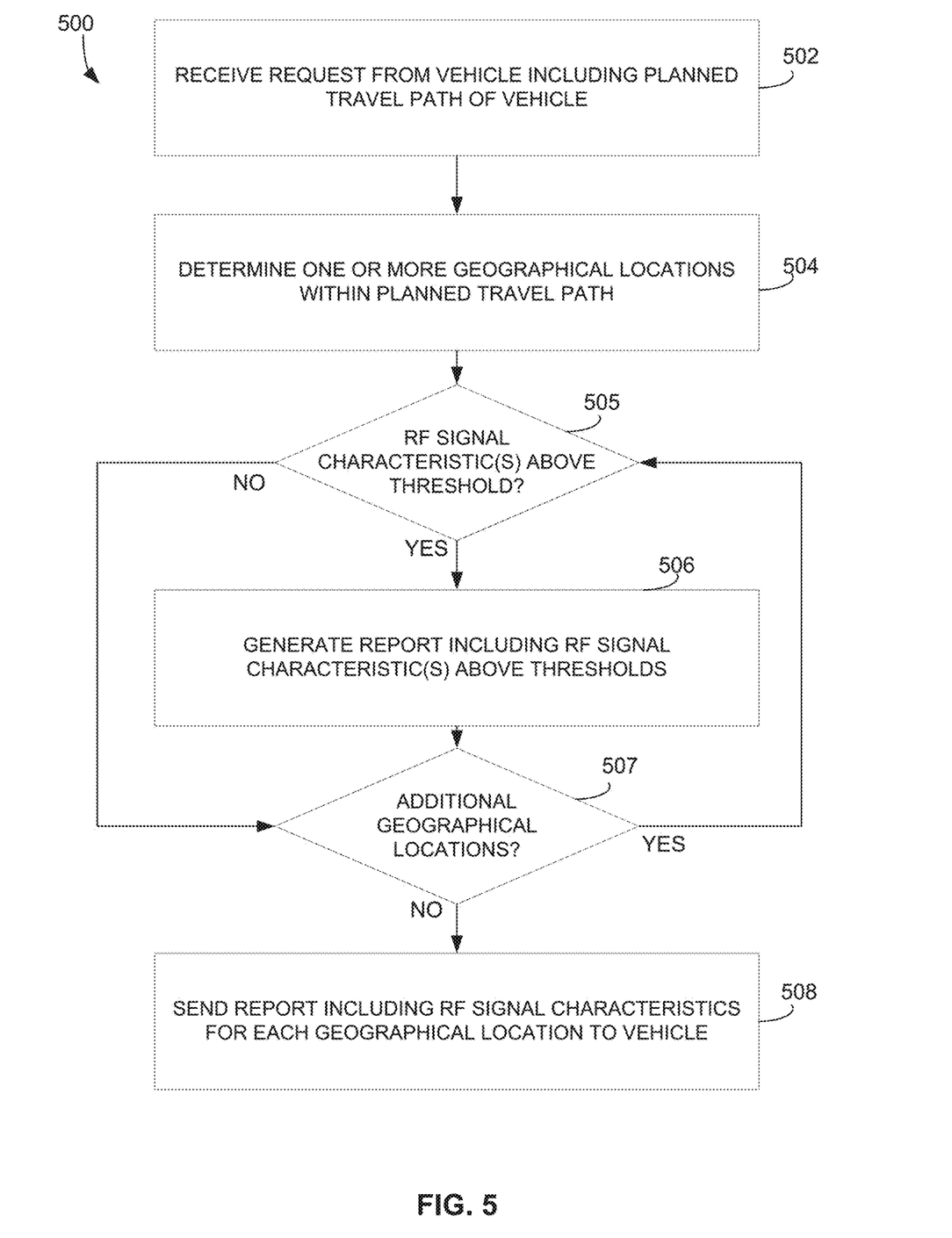
FIG. 5 depicts a flow diagram of an exemplary method for sending a threat report to a vehicle based on RF signal characteristics of one or more geographical locations.

FIG. 5 depicts a flow diagram of an exemplary method for sending a threat report to a vehicle based on RF signal characteristics of one or more geographical locations. In one embodiment, method 500 is performed as part of block 406 of method 400. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 500 includes receiving a request at block 502 from a vehicle that includes a planned travel path of the vehicle. In one embodiment, the travel path of the vehicle includes a current geographical location of the vehicle, a destination location the vehicle intends to travel to, and a path of travel between the current location and the destination. The travel path can be represented by spatial coordinates of a coordinate system. Method 500 then proceeds to block 504 to determine one or more geographical locations that are within the planned travel path of the vehicle; that is, the geographical locations covered between the current position of the vehicle and the intended destination (including the geographical location at the destination site).

For each geographical location within the vehicle's planned travel path, method 500 performs an iterative process to determine the extent (if any) of any significant RF signal interference in the geographical locations. Proceeding to block 505, method 500 determines whether one or more RF signal characteristics corresponding to a selected geographical location are above a threshold indicative of high RF signal interference. If there are any RF signal characteristics at the geographical location that exceed the threshold level, then method 500 proceeds to block 506 to begin generating a report that includes all of the RF signal characteristics above the threshold. Method 500 then proceeds to block 507 and determines whether there are any additional geographical locations within the planned travel path of the vehicle. For any additional geographical locations, method 500 reverts back to block 505 and repeats the process of determining significant RF signal characteristics at the additional geographical locations and modifies the generated report with the RF signal characteristics at the other geographical locations.

Conversely, if there are no RF signal characteristics that exceed a threshold at the geographical location (block 505), then method 500 proceeds directly to block 507 to determine whether there are any additional geographical locations in the planned travel path of the vehicle. If so, then method 500 proceeds as previously described for each geographical location. If no geographical locations remain, then method 500 proceeds to block 508 and sends the report including the RF signal characteristics for each geographical location exceeding the threshold(s) to the vehicle that sent the request. In the unlikely case that there are no RF signal characteristics above a threshold for each geographical location in the planned travel path of the vehicle, then method 500 can send a message to the vehicle indicating that no significant RF interference was determined based on the parameters provided in the request. When the vehicle receives the report message, the vehicle can then adjust its travel path accordingly based on the RF signal characteristics described in the report message.

Figure 6:
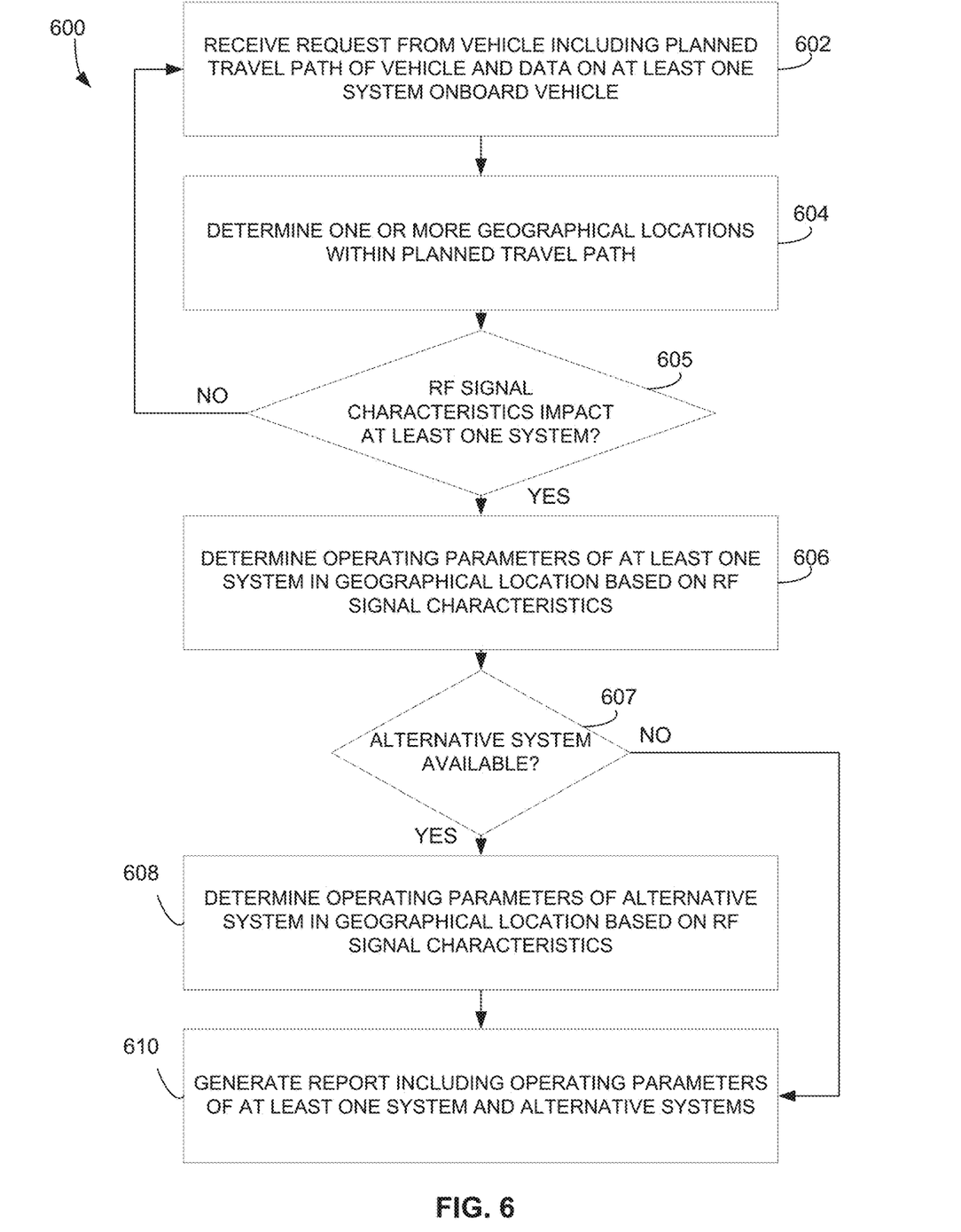
FIG. 6 depicts a flow diagram of an exemplary method for sending a system use recommendation to a vehicle based on RF signal characteristics of one or more geographical locations.

FIG. 6 depicts a flow diagram of an exemplary method for sending a system use recommendation to a vehicle based on RF signal characteristics of one or more geographical locations. In one embodiment, method 600 is performed as part of block 406 of method 400. Method 600 can optionally be performed in conjunction with method 500. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 600 includes block 602, and receives a request from a vehicle that includes a planned travel path of the vehicle and data on at least one system onboard the vehicle. The data can include data on one or more systems that utilize RF signal transmissions, as well as on other systems that do not rely on RF functionality. Method 600 then proceeds to block 604 and determines one or more geographical locations within the planned travel path, as previously described.

At block 605, method 600 proceeds by determining whether there are any RF signal characteristics for the selected geographical location that impact at least one system onboard the vehicle. If there are no RF sources that impact a system onboard the vehicle at the selected geographical location, method 600 can move to another geographical location in the planned travel path and repeat block 605, or, if there are no additional geographical locations, method 600 can simply generate a message to the vehicle indicating that there is no significant RF interference to systems on the vehicle in the planned travel path. Alternatively, method 600 may determine that one or more of the systems using RF signal transmissions should not be used in the geographical locations, and indicates in the report to the vehicle of the unusable systems. The number and type of systems, and the operating parameters corresponding to each system, may differ between geographical location depending on the RF signal characteristics corresponding to the geographical locations.

If there are RF signal characteristics that impact at least one system of the vehicle at the geographical location, then method 600 proceeds to block 606 and determines one or more operating parameters of at least one of the systems for operation in the geographical location based on the RF characteristics. For example, method 600 can determine a transmit power level and/or acceptable frequency range of one or more systems that would be impacted during operation in the geographical location. Proceeding to block 607, method 600 determines from the request whether there are alternative systems (e.g., systems that do not rely on RF signal transmissions) available for use while traversing through the geographical location. If there are any such systems, method 600 proceeds to block 608 and determines one or more operating parameters of each alternative system(s) for operation in the geographical location based on the RF signal characteristics. Then method 600 proceeds to block 610 to generate a report that includes the operating parameters of the system(s) impacted by the RF interference characteristics at each geographical location (if available), and/or the operating parameters of any alternative systems at each geographical location. Method 600 then sends a message to the vehicle including the report, which can be used by the vehicle in adjusting its travel path based on the recommendations provided in the report. The vehicle may also take additional corrective action, such as conducting integrity checks to its operating systems as a way to assess system functionality, as previously described in conjunction with FIG. 3.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

Example Embodiments

Example 1 includes a program product comprising a non-transitory processor-readable medium on which program instructions configured to be executed by at least one processor are embodied, wherein when executed by the at least one processor, the program instructions cause the at least one processor to: gather radio frequency (RF) signal characteristics associated with a plurality of geographical locations, the RF signal characteristics providing potential RF signal interference information used in at least one of preparing and adjusting vehicle travel paths; store data including the RF signal characteristics associated with each of the plurality of geographical locations in an RF interference database; and disseminate the data including RF signal characteristics associated with the plurality of geographical locations in the RF interference database to at least one operating system of a plurality of vehicles in a communications network configured to plan a travel path through at least one of the plurality of geographical locations.

Example 2 includes the program product of Example 1, wherein to disseminate the data including RF signal characteristics comprises to disseminate the data to the at least one operating system including at least one avionics system of an aerial vehicle.

Example 3 includes the program product of any of Examples 1-2, wherein the program instructions cause the at least one processor to issue an alert to the at least one operating system when the disseminated data including the RF signal characteristics associated with one of the plurality of geographical locations in the RF interference database exceed a signal interference threshold associated with a current travel path and/or geographical location of a vehicle of the plurality of vehicles.

Example 4 includes the program product of any of Examples 1-3, wherein the program instructions cause the at least one processor to: evaluate the RF signal characteristics for a corresponding geographical location to generate threat levels based on a threat priority associated with the RF signal characteristics; and provide the threat levels to the at least one operating system of a respective vehicle in response to a request from the respective vehicle.

Example 5 includes the program product of Example 4, wherein the RF interference database is implemented on a remote server, and wherein the program instructions cause the at least one processor to store the evaluated RF signal characteristics, the threat levels, and an alternative operating system availability for the respective vehicle associated with the request.

Example 6 includes the program product of any of Examples 4-5, wherein the program instructions cause the at least one processor to synchronize data with the at least one operating system of the respective vehicle associated with the request, and to provide a recommendation for alternative use parameters of the at least one operating system of the respective vehicle.

Example 7 includes the program product of any of Examples 4-6, wherein the threat levels are generated based on severity of RF signal interference from the RF signal characteristics and the at least one operating system of the respective vehicle that is experiencing RF signal interference.

Example 8 includes the program product of any of Examples 1-7, wherein the RF signal characteristics include at least one of: RF frequency transmission, RF signal strength, RF reflection coefficients, RF geolocation, RF baseband designation, and RF frequency range.

Example 9 includes the program product of any of Examples 1-8, wherein to disseminate the data including RF signal characteristics comprises indicating whether a source of an RF interference at one of the geographical locations is a temporary source of RF interference or a fixed source of RF interference.

Example 10 includes the program product of any of Examples 1-9, wherein the RF signal characteristics include measurements based on a function of a defined distance from at least one RF ground system at one of the geographical locations.

Example 11 includes a method, comprising: gathering radio frequency (RF) signal characteristics associated with a plurality of geographical locations, the RF signal characteristics providing potential RF signal interference information used in at least one of preparing and adjusting vehicle travel paths; storing data including the RF signal characteristics associated with each of the plurality of geographical locations in an RF interference database; and disseminating the data including RF signal characteristics associated with the plurality of geographical locations in the RF interference database to at least one operating system of a plurality of vehicles in a communications network configured to plan a travel path through at least one of the plurality of geographical locations.

Example 12 includes the method of Example 11, comprising issuing an alert to the at least one operating system when the disseminated data including the RF signal characteristics associated with one of the plurality of geographical locations in the RF interference database exceed a signal interference threshold associated with a current travel path and/or geographical location of a vehicle of the plurality of vehicles.

Example 13 includes the method of any of Examples 11-12, comprising evaluating the RF signal characteristics for a corresponding geographical location to generate threat levels based on a threat priority associated with the RF signal characteristics; and to provide the threat levels to the at least one operating system of a respective vehicle in response to a request from the respective vehicle.

Example 14 includes the method of Example 13, comprising storing the evaluated RF signal characteristics, the threat levels, and an alternative operating system availability for the respective vehicle associated with the request.

Example 15 includes the method of any of Examples 13-14, comprising synchronizing data with the at least one operating system of the respective vehicle associated with the request, and to provide a recommendation for alternative use parameters of the at least one operating system of the respective vehicle.

Example 16 includes the method of any of Examples 11-15, wherein disseminating the data including RF signal characteristics comprises indicating whether a source of an RF interference at one of the geographical locations is a temporary source of RF interference or a fixed source of RF interference.

Example 17 includes the method of any of Examples 11-16, wherein the RF signal characteristics include at least one of: RF frequency transmission, RF signal strength, RF reflection coefficients, RF geolocation, RF baseband designation, and RF frequency range.

Example 18 includes a vehicle travel planning system, comprising: at least one operating system configured to control vehicle operations; and a processing system coupled to the at least one operating system, the processing system comprising at least one processor and a memory coupled to the at least one processor, wherein the at least one processor is configured to execute an RF interference application stored in the memory, wherein when executed, the RF interference application causes the at least one processor to: gather radio frequency (RF) signal characteristics associated with a plurality of geographical locations, the RF signal characteristics providing potential RF signal interference information used in at least one of preparing and adjusting vehicle travel paths; store data including the RF signal characteristics associated with each of the plurality of geographical locations in an RF interference database stored in the memory; and disseminate the data including RF signal characteristics associated with the plurality of geographical locations in the RF interference database to the at least one operating system of the vehicle; wherein the vehicle is configured to at least one of prepare and adjust a travel path through at least one of the plurality of geographical locations based on the disseminated data, and adjust an operating parameter of the at least one operating system in response to a threat evaluation to the at least one operating system based on the disseminated data.

Example 19 includes the vehicle travel planning system of Example 18, wherein the at least one processor is configured to implement a machine learning algorithm to periodically update the RF interference database.

Example 20 includes the vehicle travel planning system of any of Examples 18-19, wherein the vehicle is an aerial vehicle, wherein the at least one operating system includes at least one avionics system, and wherein the aerial vehicle is configured to generate a modified flight plan based on synchronized data from the RF interference database with data from the at least one avionics system of the aerial vehicle, and wherein the at least one avionics system is configured to perform an integrity check based on synchronized data from the RF interference database.

The terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A program product comprising a non-transitory processor-readable medium on which program instructions configured to be executed by at least one processor are embodied, wherein when executed by the at least one processor, the program instructions cause the at least one processor to:
    gather radio frequency (RF) signal characteristics in RF bands from the High Frequency (HF) band to the KU-Band associated with a plurality of geographical locations, the RF signal characteristics providing information on potential RF signal interference that could impact operating systems on a vehicle including navigation systems, automatic direction finder systems, high frequency communications systems, very high frequency omnidirectional range (VOR) systems, very high frequency communications systems, distance measuring equipment (DME) transmitters, traffic alert and collision avoidance systems (TCAS), global navigation satellite systems (GNSS), satellite communications (SATCOM), radar altimeters, microwave landing systems, and weather radar;
    store data including the RF signal characteristics associated with each of the plurality of geographical locations in an RF interference database; and
    disseminate the data including RF signal characteristics associated with the plurality of geographical locations in the RF interference database to at least one operating system of a plurality of vehicles configured to travel on a path through at least one of the plurality of geographical locations, wherein the vehicle selectively adjusts the path of the vehicle and operation of an impacted one or more of the at least one operating system based on the disseminated data.

2. The program product of claim 1, wherein to disseminate the data including RF signal characteristics comprises to disseminate the data to the at least one operating system including at least one avionics system of an aerial vehicle.

3. The program product of claim 1, wherein the program instructions cause the at least one processor to issue an alert to the at least one operating system when the disseminated data including the RF signal characteristics associated with one of the plurality of geographical locations in the RF interference database exceed a signal interference threshold associated with a current travel path and/or geographical location of a vehicle of the plurality of vehicles.

4. The program product of claim 1, wherein the program instructions cause the at least one processor to:
    evaluate the RF signal characteristics for a corresponding geographical location to generate threat levels based on a threat priority associated with the RF signal characteristics; and
    provide the threat levels to the at least one operating system of a respective vehicle in response to a request from the respective vehicle.

5. The program product of claim 4, wherein the RF interference database is implemented on a remote server, and wherein the program instructions cause the at least one processor to store the evaluated RF signal characteristics, the threat levels, and an alternative operating system availability for the respective vehicle associated with the request.

6. The program product of claim 4, wherein the program instructions cause the at least one processor to synchronize data with the at least one operating system of the respective vehicle associated with the request, and to provide a recommendation for alternative use parameters of the at least one operating system of the respective vehicle.

7. The program product of claim 4, wherein the threat levels are generated based on severity of RF signal interference from the RF signal characteristics and the at least one operating system of the respective vehicle that is experiencing RF signal interference.

8. The program product of claim 1, wherein the RF signal characteristics include at least one of: RF frequency transmission, RF signal strength, RF reflection coefficients, RF geolocation, RF baseband designation, and RF frequency range.

9. The program product of claim 1, wherein to disseminate the data including RF signal characteristics comprises indicating whether a source of an RF interference at one of the geographical locations is a temporary source of RF interference or a fixed source of RF interference.

10. The program product of claim 1, wherein the RF signal characteristics include measurements based on a function of a defined distance from at least one RF ground system at one of the geographical locations.

11. A method, comprising:
    gathering radio frequency (RF) signal characteristics in RF bands from the High Frequency (HF) band to the KU-Band associated with a plurality of geographical locations, the RF signal characteristics providing information on potential RF signal interference that could impact operating systems on a vehicle including navigation systems, automatic direction finder systems, high frequency communications systems, very high frequency omnidirectional range (VOR) systems, very high frequency communications systems, distance measuring equipment (DME) transmitters, traffic alert and collision avoidance systems (TCAS), global navigation satellite systems (GNSS), satellite communications (SATCOM), radar altimeters, microwave landing systems, and weather radar;
    storing data including the RF signal characteristics associated with each of the plurality of geographical locations in an RF interference database; and
    disseminating the data including RF signal characteristics associated with the plurality of geographical locations in the RF interference database to at least one operating system of a plurality of vehicles configured to travel on a path through at least one of the plurality of geographical locations, wherein the vehicle selectively adjusts the path of the vehicle and operation of an impacted one or more of the at least one operating system based on the disseminated data.

12. The method of claim 11, comprising issuing an alert to the at least one operating system when the disseminated data including the RF signal characteristics associated with one of the plurality of geographical locations in the RF interference database exceed a signal interference threshold associated with a current travel path and/or geographical location of a vehicle of the plurality of vehicles.

13. The method of claim 11, comprising evaluating the RF signal characteristics for a corresponding geographical location to generate threat levels based on a threat priority associated with the RF signal characteristics; and to provide the threat levels to the at least one operating system of a respective vehicle in response to a request from the respective vehicle.

14. The method of claim 13, comprising storing the evaluated RF signal characteristics, the threat levels, and an alternative operating system availability for the respective vehicle associated with the request.

15. The method of claim 13, comprising synchronizing data with the at least one operating system of the respective vehicle associated with the request, and to provide a recommendation for alternative use parameters of the at least one operating system of the respective vehicle.

16. The method of claim 11, wherein disseminating the data including RF signal characteristics comprises indicating whether a source of an RF interference at one of the geographical locations is a temporary source of RF interference or a fixed source of RF interference.

17. The method of claim 11, wherein the RF signal characteristics include at least one of: RF frequency transmission, RF signal strength, RF reflection coefficients, RF geolocation, RF baseband designation, and RF frequency range.

18. A vehicle travel planning system, comprising:
at least one operating system configured to control vehicle operations of a vehicle; and
a processing system coupled to the at least one operating system, the processing system comprising at least one processor and a memory coupled to the at least one processor, wherein the at least one processor is configured to execute an RF interference application stored in the memory, wherein when executed, the RF interference application causes the at least one processor to:
gather radio frequency (RF) signal characteristics in RF bands from the High Frequency (HF) band to the KU-Band associated with a plurality of geographical locations, the RF signal characteristics providing information on potential RF signal interference that could impact operating systems on a vehicle including navigation systems, automatic direction finder systems, high frequency communications systems, very high frequency omnidirectional range (VOR) systems, very high frequency communications systems, distance measuring equipment (DME) transmitters, traffic alert and collision avoidance systems (TCAS), global navigation satellite systems (GNSS), satellite communications (SATCOM), radar altimeters, microwave landing systems, and weather radar;
store data including the RF signal characteristics associated with each of the plurality of geographical locations in an RF interference database stored in the memory; and
disseminate the data including RF signal characteristics associated with the plurality of geographical locations in the RF interference database to the at least one operating system of the vehicle;
wherein the vehicle travel planning system is configured to selectively prepare and adjust a travel path of the vehicle through at least one of the plurality of geographical locations based on the disseminated data, and adjust an operating parameter of the at least one operating system in response to a threat evaluation to the at least one operating system based on the disseminated data.

19. The vehicle travel planning system of claim 18, wherein the at least one processor is configured to implement a machine learning algorithm to periodically update the RF interference database.

20. The vehicle travel planning system of claim 18, wherein the vehicle is an aerial vehicle, wherein the at least one operating system includes at least one avionics system, and wherein the vehicle travel planning system is configured to generate a modified flight plan based on synchronized data from the RF interference database with data from the at least one avionics system of the aerial vehicle, and wherein the at least one avionics system is configured to perform an integrity check based on synchronized data from the RF interference database.

* * * * *